US011138281B2

(12) United States Patent
Markman et al.

(10) Patent No.: US 11,138,281 B2
(45) Date of Patent: Oct. 5, 2021

(54) SYSTEM USER ATTRIBUTE RELEVANCE BASED ON ACTIVITY

(71) Applicant: Microsoft Technology Licensing, LLC, Redmond, WA (US)

(72) Inventors: Vita G. Markman, San Francisco, CA (US); Ye Yuan, Mountain View, CA (US); Varun Mithal, Sunnyvale, CA (US); Igor Vladimir Yagolnitser, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 16/419,755

(22) Filed: May 22, 2019

(65) Prior Publication Data
US 2020/0372090 A1 Nov. 26, 2020

(51) Int. Cl.
*G06F 16/00* (2019.01)
*G06F 16/9536* (2019.01)
*G06Q 50/20* (2012.01)
*G06F 16/9535* (2019.01)

(52) U.S. Cl.
CPC ...... *G06F 16/9536* (2019.01); *G06F 16/9535* (2019.01); *G06Q 50/2057* (2013.01)

(58) Field of Classification Search
CPC .......... G06F 16/9535; G06F 16/24578; G06F 16/248; G06F 16/3344; G06F 16/335; G06F 16/35; G06F 16/9024; G06F 16/951; G06F 40/284; G06F 40/30; G06F 16/95
See application file for complete search history.

(56) References Cited

U.S. PATENT DOCUMENTS

| | | | |
|---|---|---|---|
| 10,713,794 B1 * | 7/2020 | He ...................... G06N 3/0454 |
| 2002/0129368 A1 * | 9/2002 | Schlack ............. H04N 21/4661 | 725/46 |
| 2010/0030578 A1 * | 2/2010 | Siddique ................ G06Q 40/12 | 705/3 |
| 2012/0163206 A1 * | 6/2012 | Leung ..................... G01S 3/023 | 370/252 |
| 2012/0265819 A1 * | 10/2012 | McGann ................ G06Q 10/00 | 709/204 |
| 2018/0039647 A1 * | 2/2018 | Winstanley ......... G06F 16/9535 |
| 2018/0322464 A1 * | 11/2018 | Pattabiraman ..... G06Q 10/1053 |

* cited by examiner

*Primary Examiner* — Shyue Jiunn Hwa
(74) *Attorney, Agent, or Firm* — Schwegman Lundberg & Woessner, P.A.

(57) ABSTRACT

Techniques for using online user activity in determining relevance of attributes to improve computer functionality in generating recommendations of online content are disclosed herein. In some embodiments, a computer system calculates a corresponding relevance score for each attribute of a user based on a total number of online postings for which the user has performed at least one of a plurality of online actions within a particular sliding window of time defining a most recent time period, an attribute activity number representing a number of online postings in the plurality of online postings that have the attribute, and an inverse of a frequency value representing how many of a total number of online postings published within the particular sliding window of time have the attribute. In some embodiments, the computer system causes at least one recommendation associated with the user to be displayed based on the calculated relevance scores.

20 Claims, 14 Drawing Sheets

500

SENIOR SOFTWARE DESIGNER
510 —▼
LINKEDIN
SAN FRANCISCO BAY AREA
POSTED 2 DAYS AGO – 682 VIEWS 512    520-1 — [ SAVE ]   [ APPLY ] — 520-2

JOB DESCRIPTION
WE ARE LOOKING FOR A HARD WORKING PASSIONATE SENIOR SOFTWARE ENGINEER WITH A FOCUS ON BOTH INTERFACE AND VISUAL DESIGN. THE IDEAL CANDIDATE IS A TEAM LEADER AND HAS EXPERIENCE IN DIGITAL ENTERPISE PRODUCTS OR SOFTWARE-AS-A-SERVICE, CREATING VISUALIZATIONS, CHARTS, AND DASHBOARDS.

SENIORITY LEVEL
SENIOR

INDUSTRY
COMPUTER SOFTWARE, INFORMATION TECHNOLOGY AND SERVICES, INTERNET

EMPLOYMENT TYPE
FULL-TIME

REQUIREMENTS
- 5+ YEARS PROFESSIONAL EXPERIENCE IN WEB DESIGN
- EXPERIENCE WORKING WITH LARGE, HIGH-TRAFFIC E-COMMERCE WEBSITES
- EXPERIENCE WITH HTML/CSS AND JAVASCRIPT

SEE MORE ▽

*FIG. 5*

🔍 SEARCH FOR JOBS  —720

RECOMMENDED JOBS FOR YOU

SOFTWARE QA ENGINEER  —710
ACME INC.
SAN FRANCISCO, CA
SOFTWARE QA ENGINEER TO PROVIDE SUPPORT TO UNDERSTAND USAGE MODELS AND DEVELOP TEST PLANS ...

SR. SOFTWARE ENGINEER  —710
WAYNE ENTERPRISES
PALO ALTO, CA
2+ YEARS OF EXPERIENCE IN SOA, DATA AND APPLICATION INTEGRATION, WEB SERVICES, ESB ...

SOFTWARE ENGINEER  —710
METROPOLIS CORP.
SAN MATEO, CA
THIS POSITION IS IDEAL FOR C/C++/ANDROID EXPERIENCE. WE ARE LOOKING FOR A HANDS-ON SELF-STARTER ...

SEE MORE ▽

SHOWING RESULTS FOR

CUSTOM FILTERS ⌄

🔍  15,112 CANDIDATES

JOB TITLES
SOFTWARE ENGINEER
+ JOB TITLES

LOCATIONS
SAN FRANCISCO BAY AREA
+ LOCATIONS

SKILLS
MACHINE LEARNING
DATA MINING
+ SKILLS

COMPANIES
+ COMPANIES

SCHOOLS
+ SCHOOLS ATTENDED

---

JANE DOE
SOFTWARE ENGINEER AT ACME CORP.
SAN FRANCISCO BAY AREA
COMPUTER SCIENCE

CURRENT   SOFTWARE ENGINEER AT ACME CORP.   2013 - PRESENT
PAST      SOFTWARE ENGINEER AT WAYNE ENTERPRISES   2010 - 2013

MORE

EDUCATION   UNIVERSITY OF CALIFORNIA BERKELEY   2000 - 2004
            SARATOGA HIGH SCHOOL

1 SHARED CONNECTION   OPEN TO NEW OPPORTUNITIES

---

JOHN SMITH
SOFTWARE ENGINEER AT GOTHAM INC.
SAN FRANCISCO BAY AREA
COMPUTER SCIENCE

CURRENT   SOFTWARE ENGINEER AT GOTHAM INC.   2014 - PRESENT
PAST      SOFTWARE ENGINEER AT LUTHOR CORP.   2011 - 2014

MORE

EDUCATION   STANFORD UNIVERSITY   2003 - 2007

*FIG. 8*

SYSTEM USER ATTRIBUTE RELEVANCE BASED ON ACTIVITY

TECHNICAL FIELD

The present application relates generally to systems and methods, and computer program products for using online user activity in determining relevance of attributes to improve computer functionality in generating recommendations of online content.

BACKGROUND

Computer systems that generate recommendations of online content for users of an online service suffer from a lack of disambiguation of data, resulting in the most relevant content being downgraded in favor of irrelevant content in the display area, such as in a list of recommendations on a landing page or in a list of search results. As a result, users of such computer systems spend a longer time in their search or navigation for content and request the computer systems to perform actions with respect to the irrelevant content, leading to excessive consumption of electronic resources, such as a wasteful use of processing power and computational expense associated with generating and displaying irrelevant content, and a wasteful use of network bandwidth associated with navigating through the irrelevant content. Other technical problems may arise as well.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 5 illustrates a GUI in which an online job posting published on an online service is displayed, in accordance with an example embodiment.

FIG. 7 illustrates a GUI in which job recommendations are displayed, in accordance with an example embodiment.

FIG. 8 illustrates a GUI in which candidate recommendations are displayed, in accordance with an example embodiment.

DETAILED DESCRIPTION

I. Overview

Figure 1:
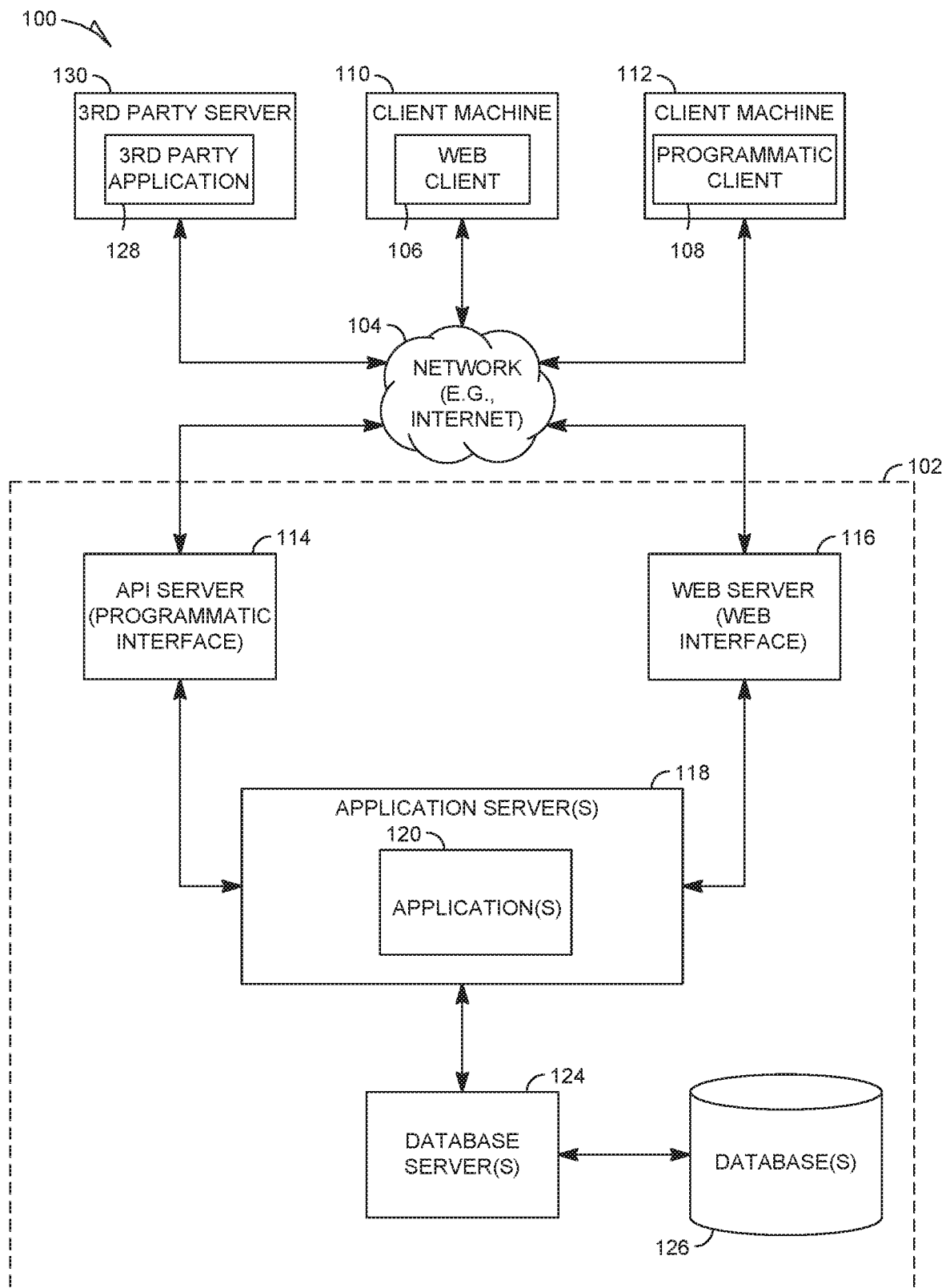
FIG. 1 is a block diagram illustrating a client-server system, in accordance with an example embodiment.

Example methods and systems of using online user activity in determining relevance of attributes to improve computer functionality in generating recommendations of online content are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. In some example embodiments, a computer system implements an algorithm configured to compute a relevance score for an attribute (e.g., a skill) of a user that indicates a level or measure of relevance of the attribute with respect to the user. Previous problems of inaccurate relevance predictions related to relatively static analyses of attributes are overcome using the features disclosed herein, which include computing the relevance score for a given attribute based on a fraction of online postings (e.g., online job postings) a user has acted on (e.g., saved, viewed, or applied) that contain the attribute over the total number of online postings the user has acted on within a given sliding window of time (e.g., within the last 120 days). The features disclosed herein also include discounting the computed fraction using an inverse frequency of the attribute across all online postings to account for the fact that some attributes appear in most online postings and, hence, should weigh less than those that are rarer across different online postings. The corresponding relevance scores for attributes of the user are then used in determining online content for presentation to the user.

The implementation of the features disclosed herein involves a non-generic, unconventional, and non-routine operation or combination of operations. By applying one or more of the solutions disclosed herein, some technical effects of the system and method of the present disclosure are to provide a specially configured recommendation system that improves the accuracy of a computer system in determining the relevance of different attributes of a user and, thus, in generating recommendations of online content for the user based on such relevance determinations by configuring the computer system to employ a dynamic analysis of user activity related to each particular attribute within a most recent sliding window of time. As a result, the amount of excessive consumption of electronic resources, such as the wasteful use of processing power and computational expense associated with generating and displaying irrelevant content and the wasteful use of network bandwidth associated with navigating through the irrelevant content, is significantly reduced, and the functioning of the computer system is improved. Other technical effects will be apparent from this disclosure as well.

II. Detailed Example Embodiments

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
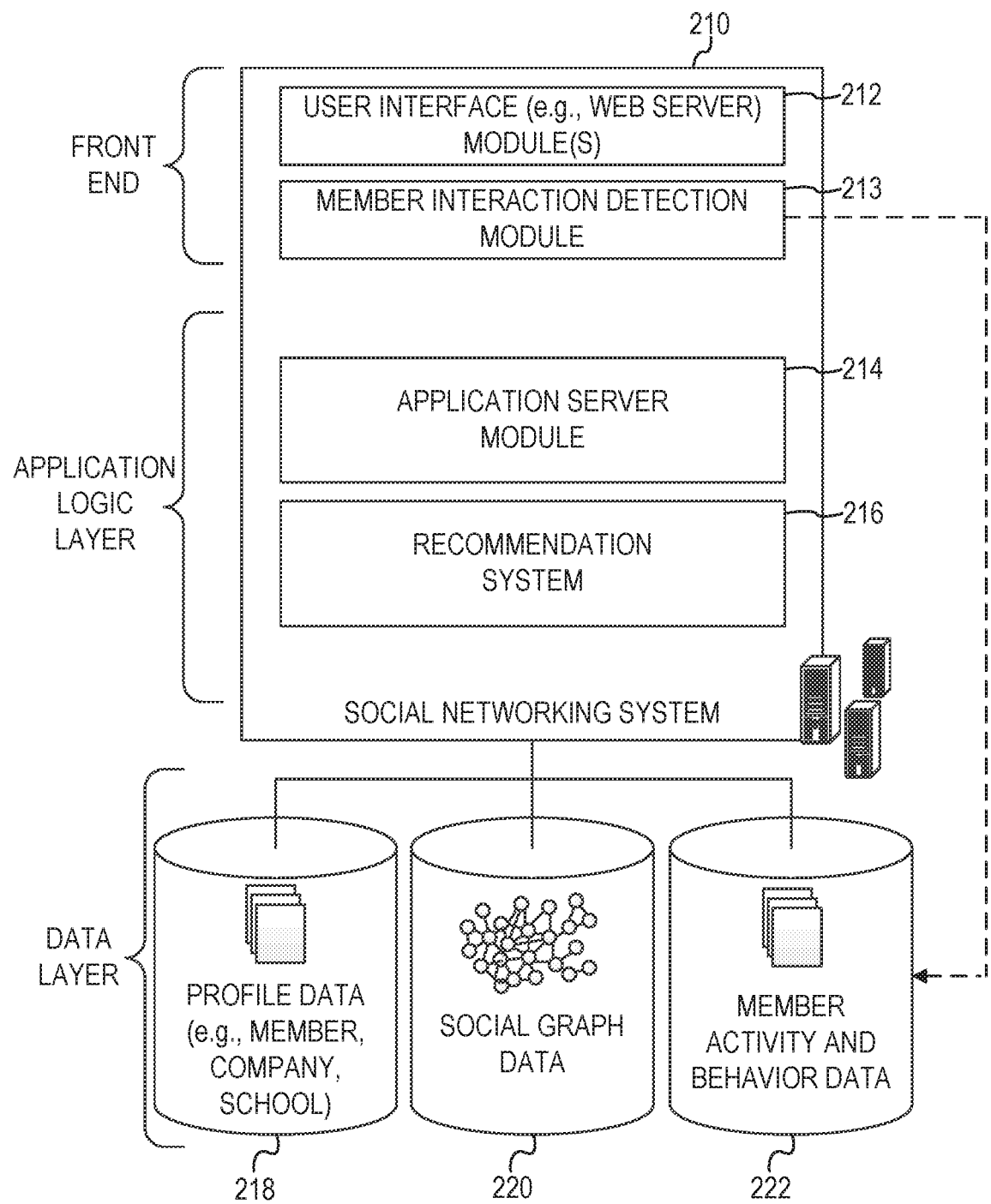
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a recommendation system 216, for use in social networking system 210, consistent with some embodiments of the present disclosure. In some embodiments, the recommendation system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the recommendation system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgment or approval by the member that is being followed. When one member follows another, the member who is following may receive status updates (e.g., in an activity or content stream) or other messages published by the member being followed or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the recommendation system 216. The members' interactions and behavior may also be tracked, stored, and used by the recommendation system 216 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the recommendation system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
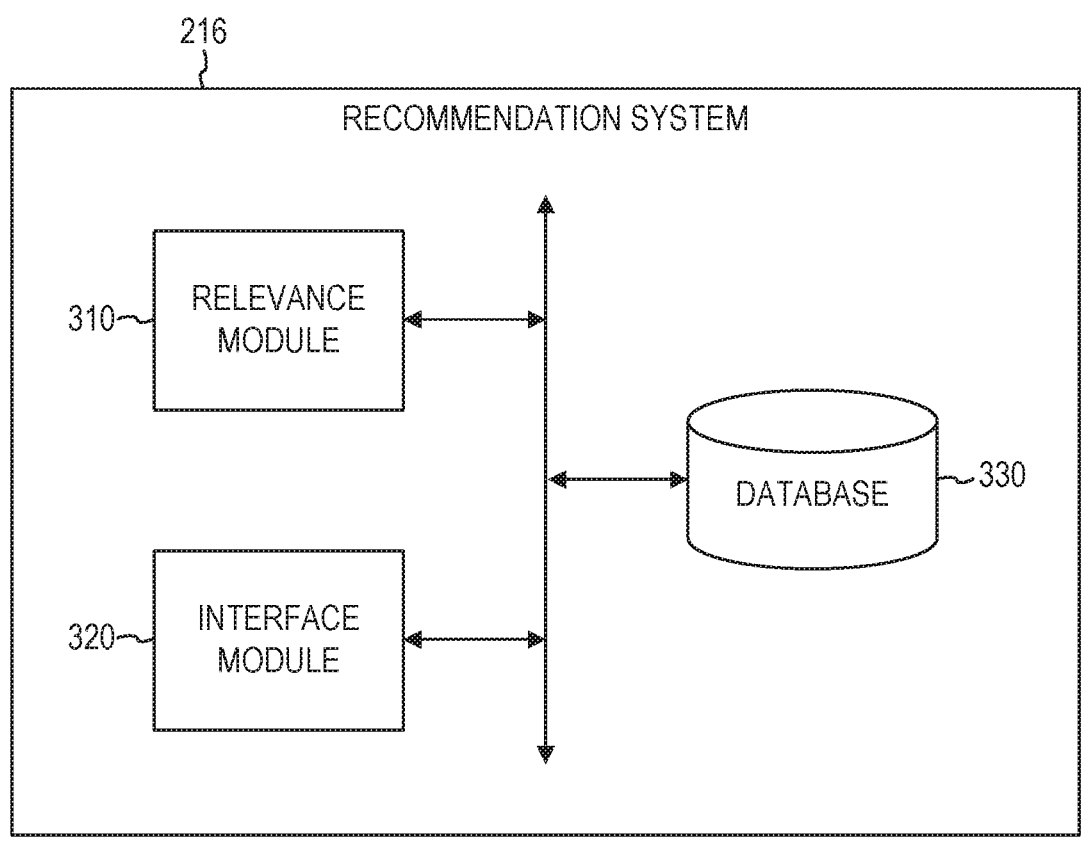
FIG. 3 is a block diagram illustrating components of a recommendation system, in accordance with an example embodiment.

FIG. 3 is a block diagram illustrating components of the recommendation system 216, in accordance with an example embodiment. In some embodiments, the recommendation system 216 comprises any combination of one or more of a relevance module 310, an interface module 320, and one or more database(s) 330. The relevance module 310, the interface module 320, and the database(s) 330 can reside on a computer system, or other machine, having a memory and at least one processor (not shown). In some embodiments, the relevance module 310, the interface module 320, and the database(s) 330 can be incorporated into the application server(s) 118 in FIG. 1. In some example embodiments, the database(s) 330 is incorporated into database(s) 126 in FIG. 1 and can include any combination of one or more of databases 218, 220, and 222 in FIG. 2. However, it is contemplated that other configurations of the relevance module 310, the interface module 320, and the database(s) 330, are also within the scope of the present disclosure.

In some example embodiments, one or more of the relevance module 310 and the interface module 320 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the relevance module 310 and the interface module 320 is configured to receive user input. For example, one or more of the relevance module 310 and the interface module 320 can present one or more GUI elements (e.g., drop-down menu, selectable buttons, text field) with which a user can submit input.

In some example embodiments, one or more of the relevance module 310 and the interface module 320 is configured to perform various communication functions to facilitate the functionality described herein, such as by communicating with the social networking system 210 via the network 104 using a wired or wireless connection. Any combination of one or more of the relevance module 310 and the interface module 320 may also provide various web services or functions, such as retrieving information from the third party servers 130 and the social networking system 210. Information retrieved by the any of the relevance module 310 and the interface module 320 may include profile data corresponding to users and members of the social networking service of the social networking system 210.

Additionally, any combination of one or more of the relevance module 310 and the interface module 320 can provide various data functionality, such as exchanging information with database(s) 330 or servers. For example, any of the relevance module 310 and the interface module 320 can access member profiles that include profile data from the database(s) 330, as well as extract attributes and/or characteristics from the profile data of member profiles. Furthermore, the one or more of the relevance module 310 and the interface module 320 can access social graph data and member activity and behavior data from database(s) 330, as well as exchange information with third party servers 130, client machines 110, 112, and other sources of information.

In some example embodiments, the relevance module 310 is configured to identify original attributes of a user of an online service. The original attributes of the user are those attributes that are stored in association with a profile of the user in a database of the online service, as opposed to related attributes, which are attributes that are not explicitly stored in association with the profile of the user, but are instead determined to be related to the original attributes that are stored in association with the profile of the user. In some example embodiments, the relevance module 310 accesses profile data of the user stored in the database 218 of FIG. 2 to identify all attributes of a particular type that are stored as profile data of the user. For example, the relevance module 310 may access the database 218 to identify all of the skills that are stored as profile data of the user. However, in addition to or as an alternative to skills, other types of attributes may be identified by the relevance module 310 as well.

Figure 4:
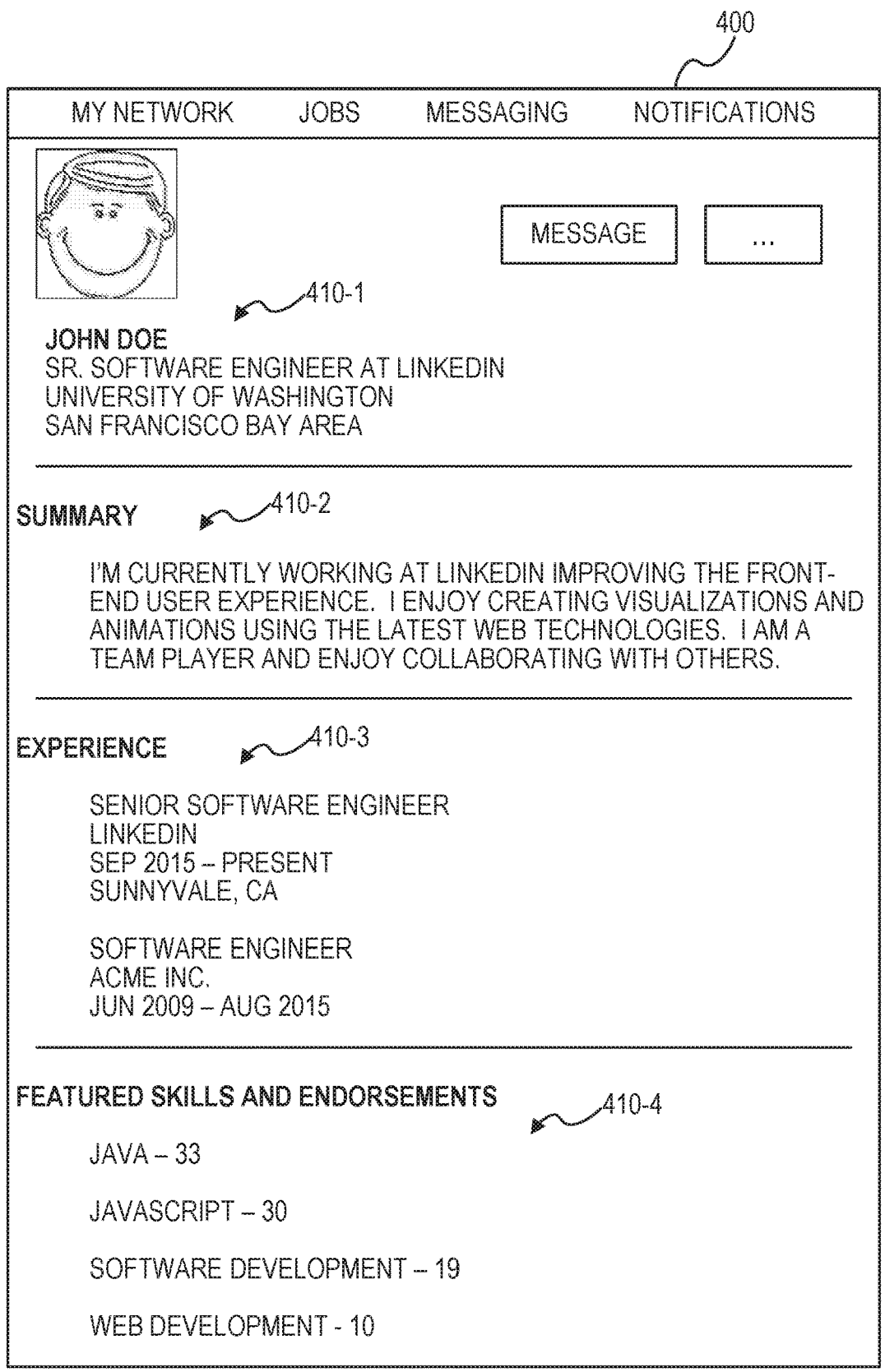
FIG. 4 illustrates a graphical user interface (GUI) in which a profile page of a user of an online service is displayed, in accordance with an example embodiment.

FIG. 4 illustrates a GUI 400 in which a profile page of a user of an online service is displayed, in accordance with an example embodiment. The profile page displayed in the GUI 400 comprises profile data 410 of the user, any of which may be identified by the relevance module 310 as original attributes of the user based on its presence on the profile page of the user. In the example shown in FIG. 4, the profile data 410 includes headline data 410-1 identifying the user (e.g., photo and name), the user's current position at a particular organization, the user's current industry (not shown), and the user's current residential location, summary data 410-2, experience data 410-3, and featured skill and endorsement data 410-4 that identifies skills of the user along with a number of endorsements from other users for the skills of the user. Other types of profile data 410, and thus original attributes, are also within the scope of the present disclosure. In some example embodiments, the GUI 400 displays each type of profile data 410 in its own dedicated section of profile page.

In some example embodiments, the interface module 320 is configured to generate recommendations associated with the user based on attributes of the user. For example, the interface module 320 may select one or more online job postings to display to the user based on skills of the user. However, merely using the list of skills included in the profile data 410-4 of the user to generate recommendations of online content for the user or about the user does not sufficiently take into account the current interests and career trajectory of the user. Even factoring in the number of endorsements for each skill does not adequately reflect how relevant the particular skill is to the user at the specific current moment in time at which recommendations are being generated. For example, if a user has sixty endorsements for the skill of data mining, it means that the user is probably highly skilled in data mining. However, it does not reflect the fact that the user may be wanting to change her career into product management as seen through her online activity and that data mining is no longer a key skill to her career.

The relevance module 310 addresses this lack of current relevancy by generating relevance scores for skills, or other attributes, that accurately reflect the user's current career, or other, interests by taking into account current online activity of the user, thereby effectively reflecting the user's ever-evolving career path or other path of interest. Skills, or other attributes, that are contained in online postings that the user has acted on via online activity (e.g., viewing an online job posting, saving an online job posting, applying to an online job posting) receive a higher relevance score than those skills that rarely figure in the user's online activity. The relevance module 310 is configured to capture the fact that users' careers are not static, but rather shift over time. This feature is particularly useful today, since in the currently rapidly changing economic landscape, many jobs are permanently exiting the market and are being replaced by new jobs, leading many users to transition and, at times, radically pivot their careers. The relevance module 310 captures such shifts by changing the relevance score, and thus the ranking, of users' skills as their online activity changes, which, in turn, enables the recommendation system 216 to dynamically update its scoring and recommendation models used in generating recommendations of online content to better serve the interests of a user who was an engineer for a long time and is now looking to become an engineering manager or a user who was a truck driver for a long time and now wants to become an automation engineer, to name a few examples.

In some example embodiments, the relevance module 310 employs an algorithm that computes a corresponding relevance score for each skill, or other type of attribute, as a fraction of online postings that the user has acted on within a given window of time via one or more predetermined online actions and that contain the given skill over the total number of online postings that the user has acted on via the one or more predetermined online actions within the given window of time. The window of time is set to a sliding window of a particular amount of time (e.g., 120 days) to reflect recency of online activity. In some example embodiments, the relevance module 310 discounts the fraction by an inverse frequency of the skill to account for the fact that some skills appear in most online postings and hence should weigh less than those skills that are rarer across different online postings.

In some example embodiments, the relevance module 310 is configured to identify a plurality of online postings for which the user has performed at least one of a plurality of online actions within a particular sliding window of time defining a most recent time period. For example, the relevance module 310 may identify all of the online job postings for which the user has performed, within the last 120 days, at least one of viewing an online job posting, saving an online job posting, and applying to an online job posting. In some example embodiments, the relevance module 310 is configured to determine the total number of online postings in the plurality of online postings for which the user has performed at least one of the plurality of online actions within the particular sliding window of time. For example, if, within the sliding window of time (e.g., within the last 120 days), the user viewed 100 online job postings, saved 10 online job postings, and applied to 3 online job postings, then the total number of online postings for which the user performed one of the set of online actions is 113 (100 views+10 saves+3 applies=113 total online actions). In some example embodiments, the relevance module 310 is configured to only count one online actions in situations in which the user performed more than one online action for the same online posting. In one example where the user performs a viewing action and a saving action for the same online job posting, the relevance module 310 only counts either the viewing action or the saving action in order to avoid double counting of online postings acted on by the user, since certain online actions involve other actions as well (e.g., any job apply action also involves a view job action).

In some example embodiments, the relevance module 310 is configure to, for each original attribute in the plurality of original attributes stored in association with the profile of the user, determine a corresponding attribute activity number that represents a number of online postings, from among the plurality of online postings identified as having been acted on by the user within the sliding window of time via one of the predetermined set of online actions, that have the original attribute. For example, for every skill the user has, the relevance module 310 may count how many online job postings containing the skill the user has acted on via one of the online actions (e.g., viewed, saved, applied to). In one example, the relevance module 310 may determine that, within the last 120 days, the user has viewed five online job postings containing the skill of C++ and applied to four online job postings containing the skill of Java, thereby resulting in an attribute activity number of five for the skill of C++ and an attribute activity number of four for the skill of Java.

In some example embodiments, the relevance module 310 accesses data of online postings to determine which online postings have a particular attribute, such a particular skill. FIG. 5 illustrates a GUI 500 in which an online job posting published on an online service is displayed, in accordance with an example embodiment. In FIG. 5, the job posting comprises headline information 510 and detailed information 512. The headline information 510 comprises basic information about the job posting, such as the job title or position (e.g., "SENIOR SOFTWARE DESIGNER"), the name of the company or organization seeking applicants for the job title or position (e.g., "LINKEDIN"), and the location of the job (e.g., "SAN FRANCISCO BAY AREA"). The detailed information 512 comprises more detailed information about the job, including, but not limited to, a job description, a seniority level of the job, one or more industries to which the job corresponds, an employment type for the job, and requirements for the job. The relevance module 310 may retrieve the attribute data (e.g., position title and industry) and skills for the job posting from a database in which the attribute data (e.g., skills) are stored as structured data, or may parse the published job posting to extract the relevant attribute data (e.g., skills).

In some example embodiments, the relevance module 310 is configured to, for each original attribute in the plurality of original attributes, determine a frequency value representing how many of a total number of online postings published on the online service within the particular sliding window of time have the original attribute. Since some skills, or other types of attributes, are more frequent across all online job postings, or other types of online postings, than other skills, the relevance module 310 may take this fact into account as an additional discounting factor by looking at every active online job posting in the sliding window of time and determining every skill that each online job posting contains in order to compute an inverse document frequency (IDF) for each skill. In one example, there are three jobs: job1, job2, and job3. Job1 contains the three skills of Java, C++, and Business, job2 contains the two skills of Business and Sales, and job3 contains the two skills of Business and Java. In this example, the relevance module 310 counts three online job postings (job1, job2, and job3) containing the skill of Business, two online job postings (job1 and job3) containing the skill of Java, one online job posting (job1) containing the skill of C++, and one job (job2) containing the skill of Sales, resulting in corresponding IDF's of 1/3 for the skill of Business, 1/2 for the skill of Java, 1/1 for the skill of C++, and 1/1 for the skill of Sales.

In some example embodiments, the relevance module 310 is configured to, for each original attribute in the plurality of original attributes, calculate a corresponding relevance score based on the corresponding attribute activity number of the original attribute, the total number of online postings in the plurality of online postings, and an inverse of the corresponding frequency value of the original attribute (e.g., the IDF value). Each relevance score may be calculated as a multiplication product of a ratio of the corresponding attribute activity number of the original attribute to the total number of online postings in the plurality of online postings and the inverse of the corresponding frequency value, such as:

$$RelevanceScore = \left(\frac{\#JobsSkillActedOn}{\#JobsActedOn}\right) \times IDF,$$

where:
JobsSkillActedOn is the corresponding attribute activity number of the original attribute,
JobsActedOn is the total number of online postings in the plurality of online postings, and
IDF is the inverse of the corresponding frequency value of the original attribute.

In some example embodiments, the relevance module 310 is configured to, in calculating the relevance score for an attribute, weight the corresponding attribute activity number of the original attribute (e.g., #JobsSkillActedOn) and the total number of online postings in the plurality of online postings (e.g., #JobsActedOn) based on the type of online action corresponding to each count. In identifying the plurality of online postings for which the user has performed at least one of the plurality of online actions, the relevance module 310 may identify a corresponding type of online action for each one of the online actions performed by the user. In some example embodiments, the relevance module 310, when calculating the relevance score, weights the corresponding attribute activity number of the original attribute and the total number of online postings in the plurality of online postings based on the corresponding identified type of online action for each one of the online actions performed by the user. Each one of the plurality of online actions may have a corresponding weight value, and the weight values of the plurality of online actions may be different from one another. In one example, a user applies to 5 job postings, saves 4 job postings, and views 10 job postings, and the relevance module weights the applied-to job postings with a weight factor of 3, saved job postings with a weight of 2, and viewed-only job postings with a weight of 1, resulting in a total weighted sum of (5*3)+(4*2)+(10*1)=33 for all online actions the user performed, in contrast to a raw sum of 19 (5+4+10=19). Other weights are within the scope of the present disclosure.

In some example embodiments, if the user performed more than one of the plurality of online actions for the same online posting, then the relevance module 310 only counts the online action with the highest weight. For each one of the plurality of online postings for which the user has performed at least two of the plurality of online actions, the relevance module 310 may select one of the performed online actions to use in weighting the corresponding attribute activity number of the original attribute based on the corresponding weight value of the selected online action being higher than the corresponding weight value of the other performed online actions. For example, using the weights from the previous example above, if the user views, saves, and applies to the same online job posting, the relevance module 310 only counts the apply action, not the view or save actions, in calculating the relevance score since the apply action has the highest weight of the performed online actions.

Figure 6:
FIG. 6 illustrates a table of relevance scores for skills of a user of an online service, in accordance with an example embodiment.

In some example embodiments, the relevance module 310 is configured to store the calculated relevance scores in association with the corresponding original attributes of the user in the database 330 of the online service for subsequent retrieval and use by the interface module 320 in generating recommendations associated with the user. FIG. 6 illustrates a table 600 of relevance scores for skills of a user of an online service, in accordance with an example embodiment. In FIG. 6, the table 600 comprises a corresponding relevance score for different skills. The skills are represented in the table 600 with corresponding skill identifiers (ID's) and skill names. The relevance scores in the table 600 are numerical scores between 0.00 and 1.00. However, other forms of relevance scores are also within the scope of the present disclosure. In some example embodiments, the relevance scores in the table 600 are generated by the relevance module 310, as discussed herein, and the associations between the generated relevance scores and the corresponding skills, or other attributes, of the user are stored in the database 330 of the online service.

In some example embodiments, the interface module 320 is configured to causing at least one recommendation associated with the user to be displayed within a user interface on a computing device based on the calculated relevance scores of the plurality of original attributes of the user. The recommendation(s) may be displayed on a landing page in response to, or otherwise based on, the user or another user navigating to the landing page via a browser. The recommendation(s) may also be displayed as part of search results on a search results page in response to, or otherwise based on, a search query submitted by the user or another user. The recommendation(s) may additionally be displayed as part of an electronic message, such as an e-mail message or a text message, transmitted to the user or another user. It is contemplated that the recommendation(s) may be displayed in other ways as well.

In some example embodiments, the generated recommendations comprise job recommendations of online job postings published on the online service, and the job recommendations are caused to be displayed to the user on the computing device of the user. FIG. 7 illustrates a GUI 700 in which job recommendations 710 are displayed on a landing page of the online service, in accordance with an example embodiment. The job recommendations 710 may each comprise one or more corresponding selectable user interface elements (e.g., hyperlinked text) configured to display more information about the corresponding online job posting of the job recommendation 710 (e.g., to view the entire online job posting rather than just an abbreviated summary of the online job posting) or to enable the user to perform some other type of online action directed towards the online job posting of the job recommendation 710, such as saving the online job posting or applying to the online job posting. Each job recommendation 710 may include information about the corresponding online job posting. For example, the job recommendations 710 may include information including, but not limited to, a job title, a company name, a geographical location, and desired skills, educational background, and work experience. Other types of information may also be included in the job recommendation 710.

The GUI 700 may also display one or more user interface elements 720 configured to enable the user to submit a search query for searching for online job postings, such as by entering keyword search terms into a search field. In response to one or more keywords being submitted by the user as part of a search query via the search field, the interface module 320 may generate job recommendations 710 based on the keyword(s), the relevance scores of the skills, or other attributes, of the user, other feature data of the user, and feature data of online job postings being evaluated as search results. The recommendations 710 displayed on the landing page or as part of search results on the search results page may be displayed in an order that is based on the corresponding scores of their corresponding online job postings, which may be based at least in part on the corresponding relevance scores of the skills, or other attributes, associated with the online job postings. For example, the higher the score of an online job posting, the more priority the recommendation 710 of the corresponding online job posting may be given in its display, such as being displayed in a higher position than recommendations 710 of online job postings having lower scores.

In some example embodiments, the generated recommendations comprise candidate recommendations for an online job posting published on the online service, and the candidate recommendations are caused to be displayed to a recruiter for the online job posting on the computing device of the recruiter. FIG. 8 illustrates a GUI 800 in which candidate recommendations 810 are displayed, in accordance with an example embodiment. In some example embodiments, the recommendation system 216 is configured to select candidates for an online job posting based at least in part on a search query submitted by a user, such as a recruiter, and to cause the selected candidates to be displayed to the user on a search results page. In GUI 800, the user (e.g., a recruiter) may submit one or more terms of a search query using one or more user interface elements. For example, the user may submit the term(s) by either entering text into a search field 820 or by using a panel of custom search filters 830 in which the user may select and enter the terms based on the corresponding category of the terms, such as job titles 830-1, locations 830-2, skills 830-3, companies 830-4, and schools 830-5. In response to the search query submitted by the user, the recommendation system 216 may cause selected candidates 810 (e.g., job candidates) to be displayed on the search results page.

In some example embodiments, the user can select one or more of the candidates 810 that are displayed and submit an instruction that the recommendation system 216 perform a user action directed towards the candidate(s) selected by the user. For example, the user action may comprise sending a message to the candidate(s) via the social networking service. In some example embodiments, the social networking service allows the user to send certain types of messages to candidates to whom the user is not connected on the social networking service. These messages may be used by the user to contact anyone outside of the user's network (e.g., anyone the user is not connected to). One example of such messages is LinkedIn's InMails. However, other types of messages are also within the scope of the present disclosure. The messages may include information regarding an open position for which the user is recruiting. Candidates who receive the messages may accept the messages and read them via the social networking service, send replies to the messages via the social networking service, decline or reject the messages via the social networking service, ignore the messages via the social networking service, or simply take no action regarding the messages.

Figure 9:
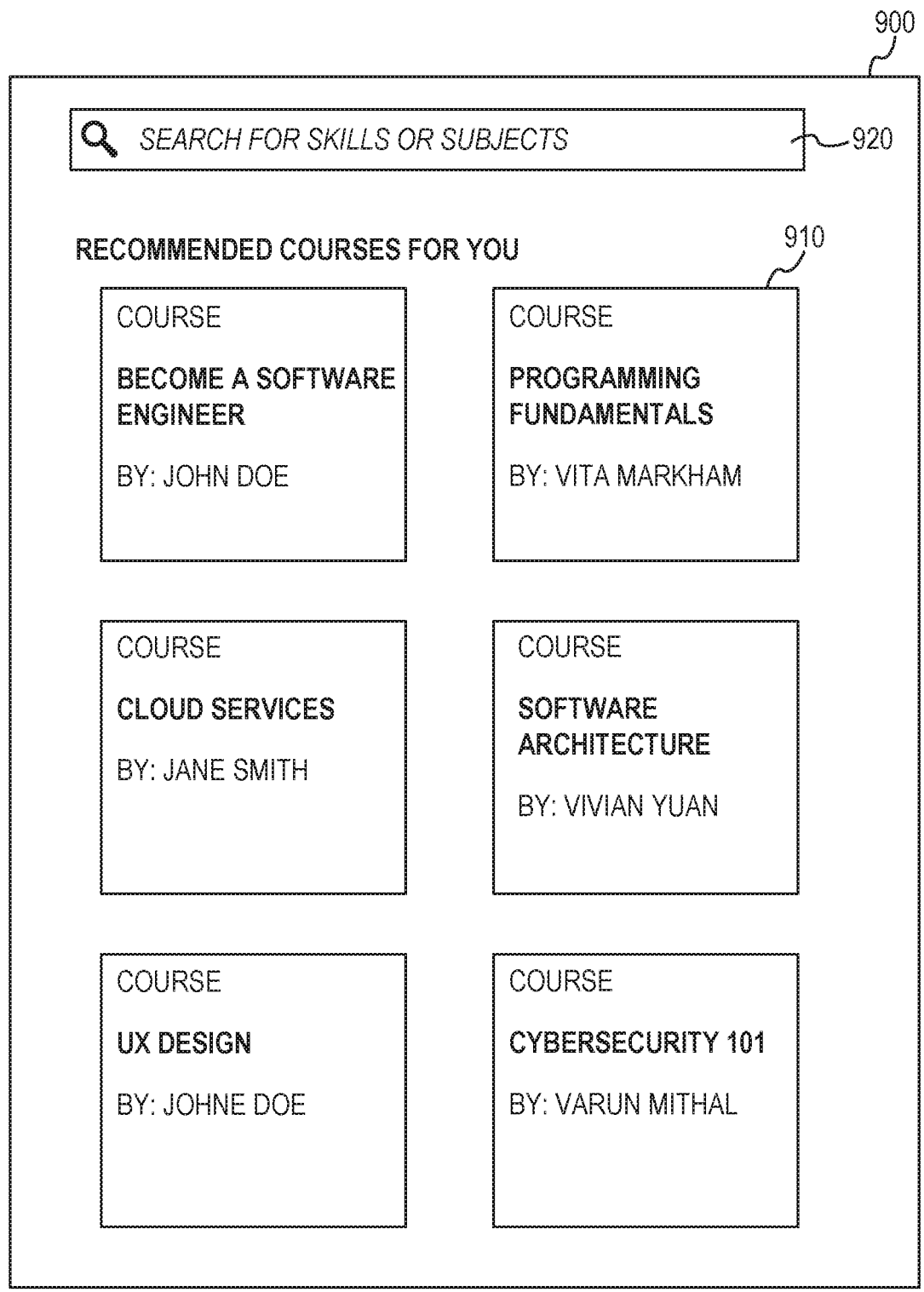
FIG. 9 illustrates a GUI in which course recommendations are displayed, in accordance with an example embodiment.

In some example embodiments, the generated recommendations comprise course recommendations of online courses published on the online service, and the course recommendations are caused to be displayed to the user on the computing device of the user. FIG. 9 illustrates a GUI 900 in which course recommendations 910 are displayed on a landing page of an online service, in accordance with an example embodiment. Each course recommendation 910 comprises a corresponding selectable user interface element and may include information about the corresponding online course, such as the title and author. Other types of information, including, but not limited to, duration and rating, may also be included in the course recommendation 910.

Each selectable user interface element of the course recommendation 910 may be configured to trigger an interaction event between the user selecting the user interface element and the online course corresponding to the selected user interface element. For example, selection of one of the selectable user interface elements may trigger a playing of the online course (e.g., playing of a video file or an audio file) or navigation to another page or another state of the same page in which the user is provided with additional information about the online course or with selectable options to watch or otherwise consume the online course.

The GUI 900 may also display one or more user interface elements 920 configured to enable the user to submit a search query for searching for online courses, such as by entering keyword search terms into a search field. In response to one or more keywords being submitted by the user as part of a search query via the search field, the interface module 320 may generate course recommendations 910 based on the keyword(s), the relevance scores of the skills, or other attributes, of the user, other feature data of the user, and feature data of online courses being evaluated as search results. The course recommendations 910 displayed on the landing page or as part of search results on the search results page may be displayed in an order that is based on the corresponding scores of their corresponding online courses, which may be based at least in part on the corresponding relevance scores of the skills, or other attributes, associated with the online courses. For example, the higher the score of an online course, the more priority the recommendation 910 of the corresponding online course may be given in its display, such as being displayed in a higher position than course recommendations 910 of online courses having lower scores.

In some example embodiments, the interface module 320 is configured to generate the recommendations using a scoring model to generate scores for online content (e.g., job postings, job candidates, online courses) that is being considered for recommendation. The scoring model may comprise a generalized linear mixed model that comprises a baseline model (e.g., a global model), a user-based model, and an item-based model. However, other configurations of the scoring model may also be employed. The baseline model is a fixed effects model, whereas the user-based model and the item-based model are random effects models. A fixed effects model is a statistical model in which the model parameters are fixed or non-random quantities. A fixed effects model may comprise a regression model in which the group means are fixed (non-random) as opposed to a random effects model in which the group means are a random sample from a population. Generally, data can be grouped according to several observed factors. The group means could be modeled as fixed or random effects for each grouping. In a fixed effects model, each group mean is a group-specific fixed quantity.

In some example embodiments, the baseline model is a generalized linear model based on feature data of the candidate online content items. A generalized linear model is a flexible generalization of ordinary linear regression that allows for response variables that have error distribution models other than a normal distribution. The generalized linear model generalizes linear regression by allowing the linear model to be related to the response variable via a link function and by allowing the magnitude of the variance of each measurement to be a function of its predicted value.

In some example embodiments, the feature data of the candidate online content items comprises one or more attributes, such as skills, interests, industries, employment history data, and educational background data. However, other types of feature data are also within the scope of the present disclosure. The feature data may be stored in and accessed by the interface module 320 from the database 330.

In some example embodiments, the generalized linear model of the baseline model is further based on a comparison of attributes of the user with the feature data of the online content item, such as the feature data of an online job posting. Such configuration of the generalized linear model may be used in use cases where recommendations for online content items are being generated for display on a landing page of an online service or in an electronic message from the online service to the user (e.g., a text message or an e-mail). In some example embodiments, the interface module 330 is configured to extract attributes, such as profile information, from a profile of the user stored in the database 218. In some example embodiments, the generalized linear model of the baseline model is further based on a comparison of a search query received from the user with the feature data of the online content item. Such configuration of the generalized linear model may be used in use cases where recommendations for online content items are being generated for display as part of search results in response to the search query.

In some example embodiments, the user-based model of the generalized linear mixed model is a random effects model based on a history of online user actions by the user directed towards reference online content items having feature data determined to be related to the feature data of the online content item being scored A random effects model, also called a variance components model, is a statistical model where the model parameters are random variables. The random effects model is a kind of hierarchical linear model, which assumes that the data being analyzed are drawn from a hierarchy of different populations whose differences relate to that hierarchy. In some example embodiments, the online user actions directed towards the reference online content items comprise at least one of selecting a user interface element indicating an interest by the user in viewing the reference online content items, selecting a user interface element indicating an interest by the user in saving the reference online content items, and selecting a user interface element indicating an interest by the user in sending a message corresponding to the reference online content items. It is contemplated that other types of online user actions are also within the scope of the present disclosure. The history of online user actions may be stored in and accessed by the interface module 320 from the database 222 in FIG. 2.

In some example embodiments, the item-based model is a random effects model based on a history of online user actions directed towards the online content item (e.g., online job posting, job candidate, online course) being scored by a plurality of reference users having profile information determined to be related to the profile information of the user for which the recommendation score is being generated. The online user actions directed towards the online content item may comprise at least one of selecting a user interface element indicating an interest by the reference users in viewing the candidate online content item, selecting a user interface element indicating an interest by the reference users in saving the candidate online content item, and selecting a user interface element indicating an interest by the user in sending a message corresponding to the reference online content item. It is contemplated that other types of online user actions are also within the scope of the present disclosure. The history of online user actions may be stored in and accessed by the interface module 320 from the database 222 in FIG. 2.

In some example embodiments, the interface module 320 is configured to, for a plurality of potential recommendations of online content items (e.g., job postings) for a user, calculate a corresponding recommendation score the potential recommendation based on the skills, or other attributes, of the user using the corresponding relevance scores for each skill of the user. The interface module 320 may then select a portion of the potential recommendations for display based on their corresponding recommendation scores, which are based on the corresponding relevance scores. For example, the interface module 320 may rank the potential recommendations based on their recommendation scores, and then select a portion of the potential recommendations based on their ranking (e.g., the top N ranked recommendations).

Since the model(s) used to generate the recommendation scores for the online content items may use the skills, or other attributes, of users in their calculation, the model(s) may use the corresponding relevance scores of the skills to accurately weight the skills in these calculations in order to provide the most relevant recommendations possible. Therefore, in some example embodiments, the interface module 320 retrieves the calculated relevance scores of original attributes and, in some cases, related attributes for use in generating recommendation scores for online content items. In some example embodiments, the interface module 320 tracks the response of users to the generated recommendations that are displayed to the users, such as whether the users perform an online action (e.g., click to view, click to save, submit an application or some other type of message associated with the recommended online content item), and then uses this user behavioural data as training data in one or more machine learning operations to train and modify the model used for calculating the relevance scores and the model(s) used for calculating the recommendation scores.

Figure 10:
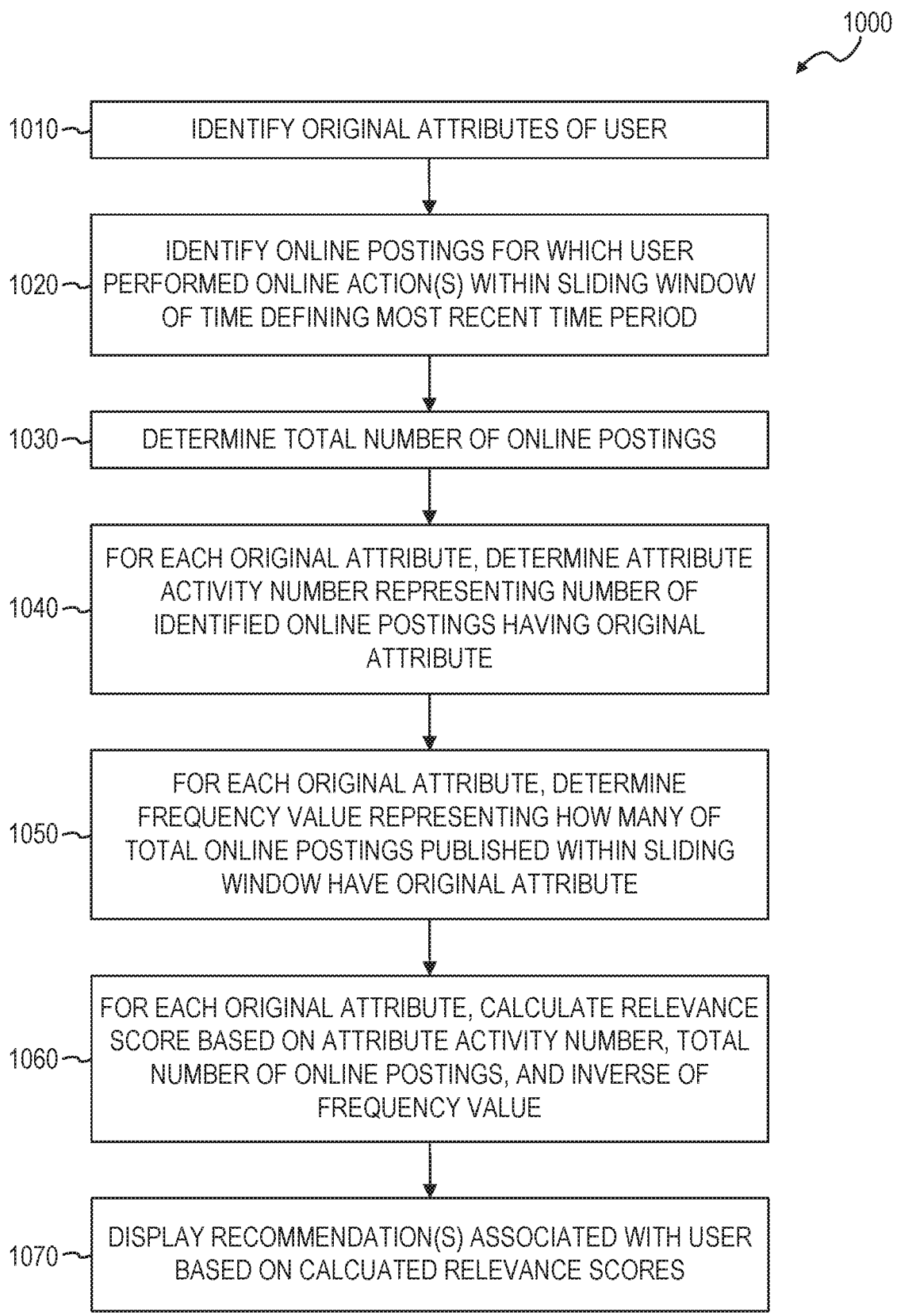
FIG. 10 is a flowchart illustrating a method of determining and using relevance scores for attributes of a user of an online service, in accordance with an example embodiment.

FIG. 10 is a flowchart illustrating a method 1000 of determining and using relevance scores for attributes of a user of an online service, in accordance with an example embodiment. The method 1000 can be performed by processing logic that can comprise hardware (e.g., circuitry, dedicated logic, programmable logic, microcode, etc.), software (e.g., instructions run on a processing device or a combination thereof. In one implementation, the method 1000 is performed by the recommendation system 216 of FIGS. 2-3, or any combination of one or more of its modules (e.g., the relevance module 310, the interface module 320), as described above.

At operation 1010, the recommendation system 216 identifies a plurality of original attributes of a user of an online service stored in association with a profile of the user in a database of the online service. In some example embodiments, the original attributes comprise skills of the user. However, other types of attributes are also within the scope of the present disclosure.

At operation 1020, the recommendation system 216 identifies a plurality of online postings for which the user has performed at least one of a plurality of online actions within a particular sliding window of time defining a most recent time period. In some example embodiments, the plurality of online postings comprises a plurality of online job postings, and the plurality of online actions comprises viewing an online job posting, saving the online job posting, and submitting an application for the online job posting. However, other types of online actions are also within the scope of the present disclosure.

At operation 1030, the recommendation system 216 determines a total number of online postings in the plurality of online postings. For example, the recommendation system 216 may determine the value for #JobsActedOn, as discussed above.

At operation 1040, the recommendation system 216, for each attribute in the plurality of original attributes, determines an attribute activity number representing a number of online postings in the plurality of online postings that have the original attribute. For example, the recommendation system 216 may determine the value for #JobsSkillActedOn, as discussed above.

At operation 1050, the recommendation system 216, for each original attribute in the plurality of original attributes, determines a frequency value representing how many of a total number of online postings published on the online service within the particular sliding window of time have the original attribute. For example, the recommendation system 216 may determine the value for IDF, as discussed above.

At operation 1060, the recommendation system 216, for each original attribute in the plurality of original attributes, calculates a corresponding relevance score based on the corresponding attribute activity number of the original attribute, the total number of online postings in the plurality of online postings, and an inverse of the corresponding frequency value of the original attribute. In some example embodiments, the corresponding relevance score comprises a multiplication product of a ratio of the corresponding attribute activity number of the original attribute to the total number of online postings in the plurality of online postings and the inverse of the corresponding frequency value. However, the corresponding relevance score may be computed in other forms as well. In some example embodiments, in calculating the corresponding relevance score for each attribute, the recommendation system 216 weights the corresponding attribute activity number of the original attribute (e.g., #JobsSkillActedOn) and the total number of online postings in the plurality of online postings (e.g., #JobsActedOn) based on the type of online action corresponding to each count, as previously discussed. In some example embodiments, if the user performed more than one of the plurality of online actions for the same online posting, then the recommendation system 216 only counts the online action with the highest weight, as previously discussed.

At operation 1070, the recommendation system 216 causes at least one recommendation associated with the user to be displayed within a user interface on a computing device based on the calculated relevance scores of the plurality of original attributes of the user. In some example embodiments, the at least one recommendation comprises at least one job recommendation of an online job posting published on the online service, and the at least one job recommendation is caused to be displayed to the user on the computing device. In some example embodiments, the at least one recommendation comprises at least one candidate recommendation for an online job posting published on the online service, and the at least one candidate recommendation is caused to be displayed to a recruiter for the other online job posting on the computing device. In some example embodiments, the at least one recommendation comprises at least one course recommendation of an online course published on the online service, and the at least one course recommendation is caused to be displayed to the user on the computing device. Other types of recommendations are also within the scope of the present disclosure.

In some example embodiments, the recommendation system 216 stores the calculated relevance scores in association with the corresponding original attributes of the user in the database of the online service as part of operation 1060, and then retrieves the stored calculated relevance scores from the database and generates the at least one recommendation based on the retrieved relevance scores as part of operation 1070.

It is contemplated that any of the other features described within the present disclosure can be incorporated into the method 1000.

In some situations, the number of attributes stored as profile information of the user is relatively low, thereby causing a problem for the computer system in accurately predicting which online content items (e.g., online job postings, job candidates, online courses) are most relevant to the user based on the attributes of the user. The relevance module 310 may solve this problem by determining one or more related attributes for the original attributes, and then calculating corresponding relevance scores for the related attributes using the same calculations discussed above for the original attributes, but applying a discounting factor to implement the fact that a related attribute is not as relevant to the user as an original attribute that is stored as profile information of the user.

In some example embodiments, the relevance module 310 is configured to determine one or more related attribute (e.g., skill) for an original attribute of the user based on a measure of association between each related attribute and the original attribute. For example, the relevance module 310 may use pointwise mutual information (PMI) values for each potential related attribute with respect to the original attribute to determine which of the potential related attributes to use as the related attributes for the original attribute. Pointwise mutual information is a correlation measure for two events or attributes, x and y, where x is the potential related attribute being evaluated and y is the original attribute for which the related attributes are being determined. The PMI value may be calculated using the following equation:

$$PMI(x; y) = \log\frac{p(x, y)}{p(x)p(y)} = \log\frac{p(x \mid y)}{p(x)} = \log\frac{p(y \mid x)}{p(y)}.$$

In some example embodiments, the relevance module 310 determines a set of related attributes for an original attribute of the user based on a threshold value for the PMI values of the related attributes. For example, the relevance module 310 may determine PMI values for potential related attributes, and then select the potential related attributes to be used as the related attributes of the original attribute based on the selected related attributes having PMI values that satisfy (e.g., are equal to or above) the threshold value. The relevance module 310 may then determine the corresponding relevance score for each selected related attribute based on an augmentation of the relevance score of the original attribute with the corresponding PMI value of the selected related attribute and a discounting factor, such as:

$$RelatedAttributeRelevance = RelevanceScore \times \left(\frac{PMI}{DiscountingFactor}\right),$$

where RelavanceScore is the relevance score of the original attribute, PMI is the PMI value of the related attribute with respect to the original attribute, and DiscountingFactor is the discounting factor configured to make the corresponding relevance score of the related attribute (RelatedAttributeRelevance) less than the corresponding relevance score of the original attribute.

In one example, the relevance module 310 has determined two related skills, C++ and Python, for the skill of Java based on their corresponding PMI values. The relevance module 310 may calculate the corresponding relevance scores of C++ and Python using the relevance score of Java, the corresponding PMI values of C++ and Python, and the discounting factor. In this example, Java has a relevance score of 0.007, the PMI value of C++ is 5.77, the PMI value of Python is 2.77, the discounting factor is 10, and the corresponding relevance values of C++ and Python are calculated as follows:

RelatedAttributeRelevance (C++)=0.007*(5.77/10)
=0.0040; and

RelatedAttributeRelevance (Python)=0.007*(2.77/10)
=0.0019.

In some example embodiments, the relevance module 310 is configured to identify one or more related attributes for the original attribute(s) of the user, calculate corresponding relevance scores for the identified related attributes, and use the calculated corresponding relevance scores for the related attributes in generating recommendations for the user in the same way the calculated corresponding relevance scores for the original attributes are used to generate recommendations for the user in response to or otherwise based on a determination that the number of original attributes stored in association with the user does not satisfy a predetermined threshold value (e.g., the user has fewer than a threshold number of skills included in his or her profile).

Figure 11:
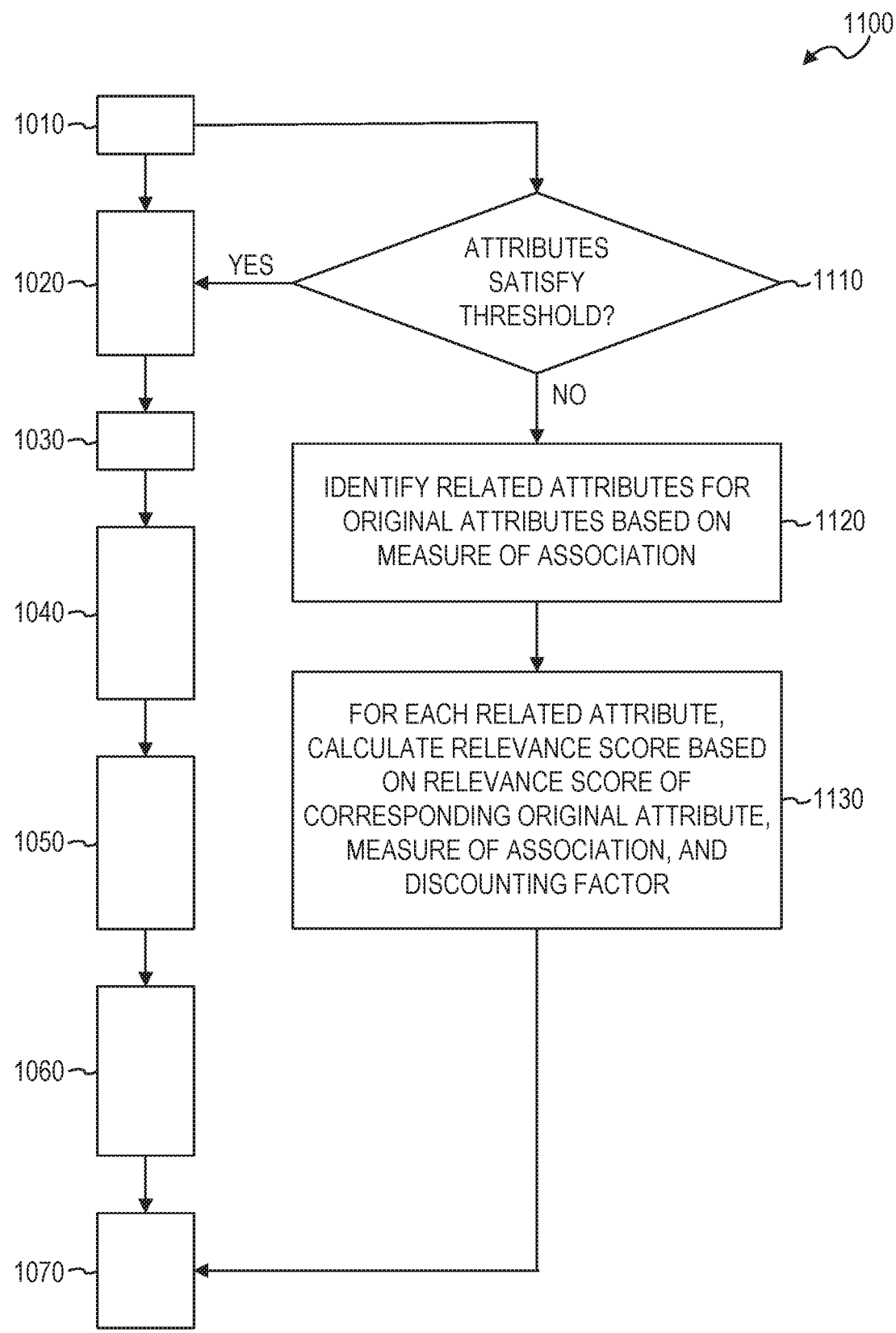
FIG. 11 is a flowchart illustrating another method of determining and using relevance scores for attributes of a user of an online service, in accordance with an example embodiment.

FIG. 11 is a flowchart illustrating another method 1100 of determining and using relevance scores for attributes of a user of an online service, in accordance with an example embodiment. The method 1100 can be performed by processing logic that can comprise hardware (e.g., circuitry, dedicated logic, programmable logic, microcode, etc.), software (e.g., instructions run on a processing device), or a combination thereof. In one implementation, the method 1100 is performed by the recommendation system 216 of FIGS. 2-3, or any combination of one or more of its modules (e.g., the relevance module 310, the interface module 320), as described above.

In the method 1100 of FIG. 11, following operation 1010 of the method 1000 in FIG. 10, the recommendation system 216 determines, at operation 1110, whether the total number of the original attributes identified at operation 1010 satisfies a threshold value. If it is determined by the recommendation system 216 that the total number of identified original attributes satisfies the threshold value, then the recommendation system 216 proceeds to operation 1020 and the rest of the operations 1030, 1040, 1050, 1060, and 1070 previously discussed with respect to the method 1000 of FIG. 10. However, if it is determined by the recommendation system 216 that the total number of identified original attributes does not satisfy the threshold value, then the recommendation system 216 proceeds to operation 1120, where, for each one of the identified original attributes, the recommendation system 216 identifies one or more related attributes based on a corresponding measure of association between each related attribute and the original attribute. Then, at operation 1130, the recommendation system 216 calculates a corresponding relevance score for each related attribute based on the corresponding relevance score of the original attribute to which the related attribute corresponds, the corresponding measure of association between the related attribute and the original attribute, and a discounting factor configured to make the corresponding relevance score of the related attribute less than the corresponding relevance score of the one of the corresponding original attribute. The recommendation system 216 then proceeds to operation 1070 of the method 1000 of FIG. 10, where the recommendation system 216 causes at least one recommendation associated with the user to be displayed within a user interface on a computing device, except that, in some example embodiments, the display of the recommendation(s) associated with the user is further based on the calculated relevance scores of the related attributes.

It is contemplated that any of the other features described within the present disclosure can be incorporated into the method 1100.

In some example embodiments, the relevance module 310 is configured to identify one or more related attributes for the original attribute(s) of the user, calculate corresponding relevance scores for the identified related attributes, and use the calculated corresponding relevance scores for the related attributes in generating recommendations for the user in the same way the calculated corresponding relevance scores for the original attributes are used to generate recommendations for the user in response to or otherwise based on a determination that the total number of original attributes of the user that have a corresponding relevance score that satisfies a threshold relevance score does not satisfy a predetermined threshold value (e.g., the number of original attributes of the user having a corresponding relevance score of at least 0.5 is fewer than a threshold number of 5).

Figure 12:
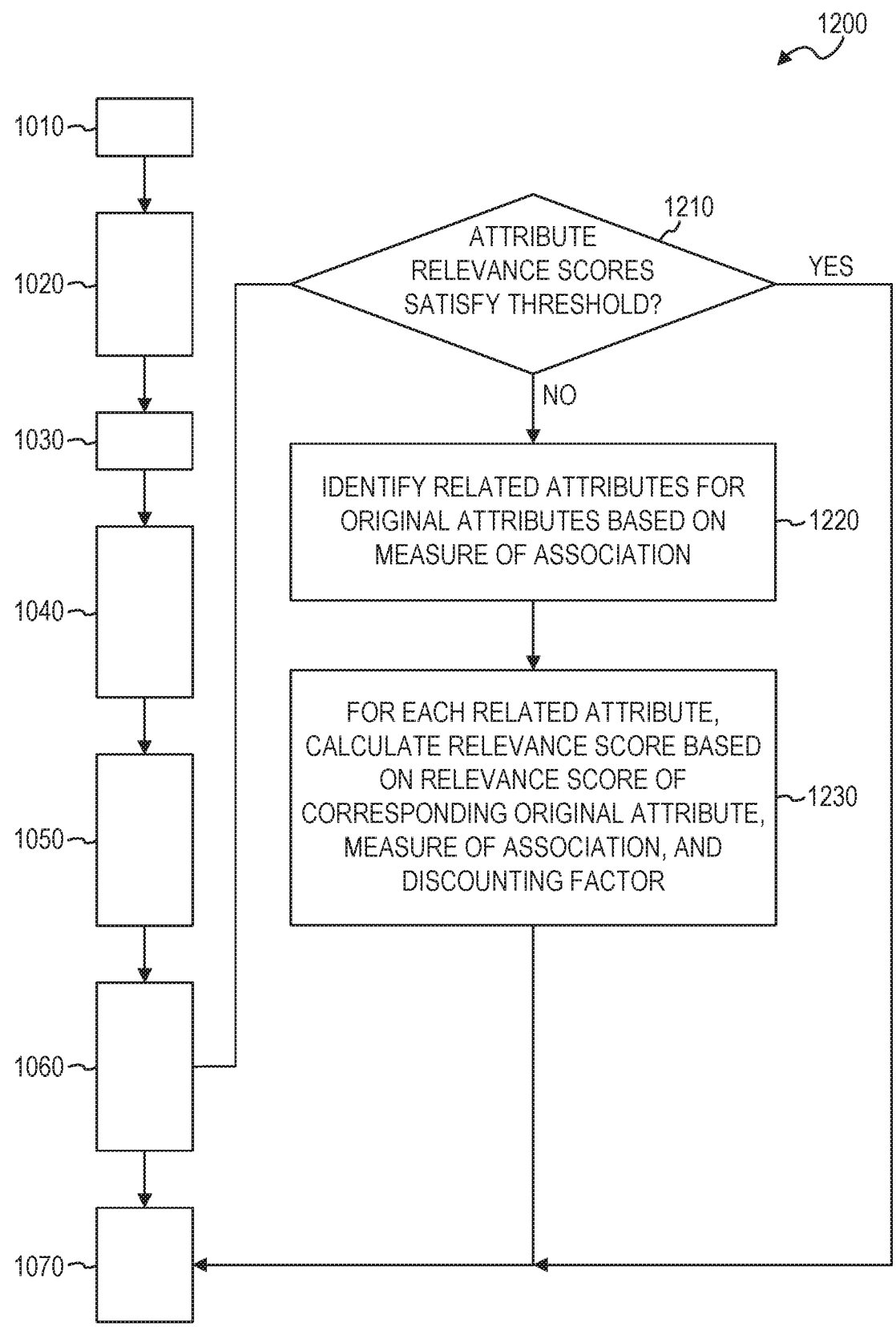
FIG. 12 is a flowchart illustrating yet another method of determining and using relevance scores for attributes of a user of an online service, in accordance with an example embodiment.

FIG. 12 is a flowchart illustrating yet another method 1200 of determining and using relevance scores for attributes of a user of an online service, in accordance with an example embodiment. The method 1200 can be performed by processing logic that can comprise hardware (e.g., circuitry, dedicated logic, programmable logic, microcode, etc.), software (e.g., instructions run on a processing device), or a combination thereof. In one implementation, the method 1200 is performed by the recommendation system 216 of FIGS. 2-3, or any combination of one or more of its modules (e.g., the relevance module 310, the interface module 320), as described above.

In the method 1200 of FIG. 12, following operation 1060 of the method 1000 in FIG. 10, the recommendation system 216 determines, at operation 1210, the total number of original attributes of the user that have a corresponding relevance score that satisfies a threshold relevance score (e.g., how many of the original attributes have a corresponding relevance score equal to or above the threshold relevance score) and whether that total number of original attributes satisfies a predetermined threshold value. If it is determined by the recommendation system 216 that the total number satisfies the threshold value, then the recommendation system 216 proceeds to operation 1070 previously discussed with respect to the method 1000 of FIG. 10. However, if it is determined by the recommendation system 216 that the total number does not satisfy the threshold value, then the recommendation system 216 proceeds to operation 1220, where, for each one of the identified original attributes, the recommendation system 216 identifies one or more related attributes based on a corresponding measure of association between each related attribute and the original attribute. Then, at operation 1230, the recommendation system 216 calculates a corresponding relevance score for each related attribute based on the corresponding relevance score of the original attribute to which the related attribute corresponds, the corresponding measure of association between the related attribute and the original attribute, and a discounting factor configured to make the corresponding relevance score of the related attribute less than the corresponding relevance score of the one of the corresponding original attribute. The recommendation system 216 then proceeds to operation 1070 of the method 1000 of FIG. 10, where the recommendation system 216 causes at least one recommendation associated with the user to be displayed within a user interface on a computing device, except that, in some example embodiments, the display of the recommendation(s) associated with the user is further based on the calculated relevance scores of the related attributes.

It is contemplated that any of the other features described within the present disclosure can be incorporated into the method 1200.

Figure 13:
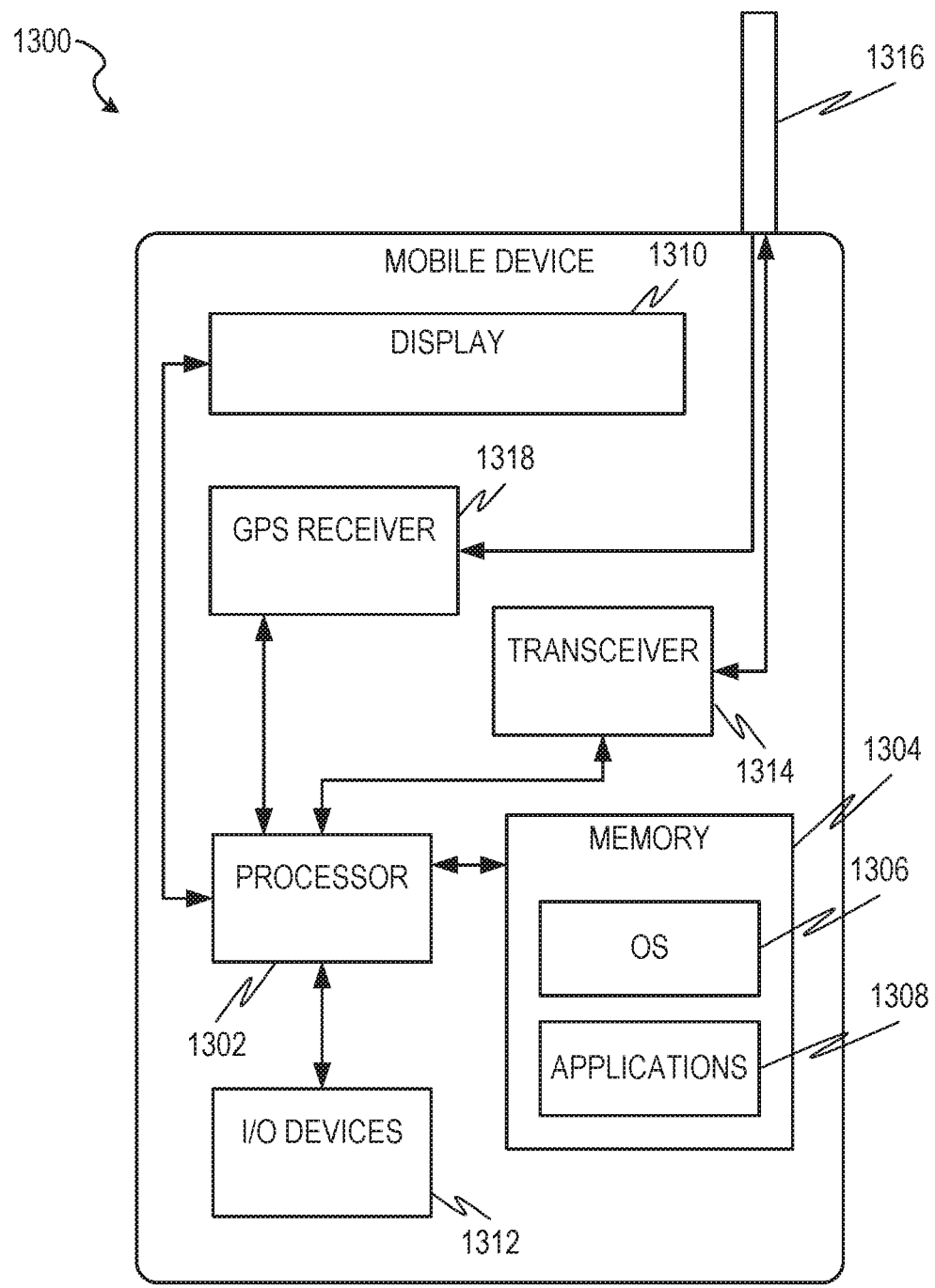
FIG. 13 is a block diagram illustrating a mobile device, in accordance with some example embodiments.

FIG. 13 is a block diagram illustrating a mobile device 1300, according to an example embodiment. The mobile device 1300 can include a processor 1302. The processor 1302 can be any of a variety of different types of commercially available processors suitable for mobile devices 1300 (for example, an XScale architecture microprocessor, a Microprocessor without Interlocked Pipeline Stages (MIPS) architecture processor, or another type of processor). A memory 1304, such as a random access memory (RAM), a Flash memory, or other type of memory, is typically accessible to the processor 1302. The memory 1304 can be adapted to store an operating system (OS) 1306, as well as application programs 1308, such as a mobile location-enabled application that can provide location-based services (LBSs) to a user. The processor 1302 can be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 can be coupled to a transceiver 1314 that interfaces with an antenna 1316. The transceiver 1314 can be configured to both transmit and receive cellular network signals, wireless data signals, or other types of signals via the antenna 1316, depending on the nature of the mobile device

1300. Further, in some configurations, a GPS receiver 1318 can also make use of the antenna 1316 to receive GPS signals.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a processor configured using software, the processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 14:
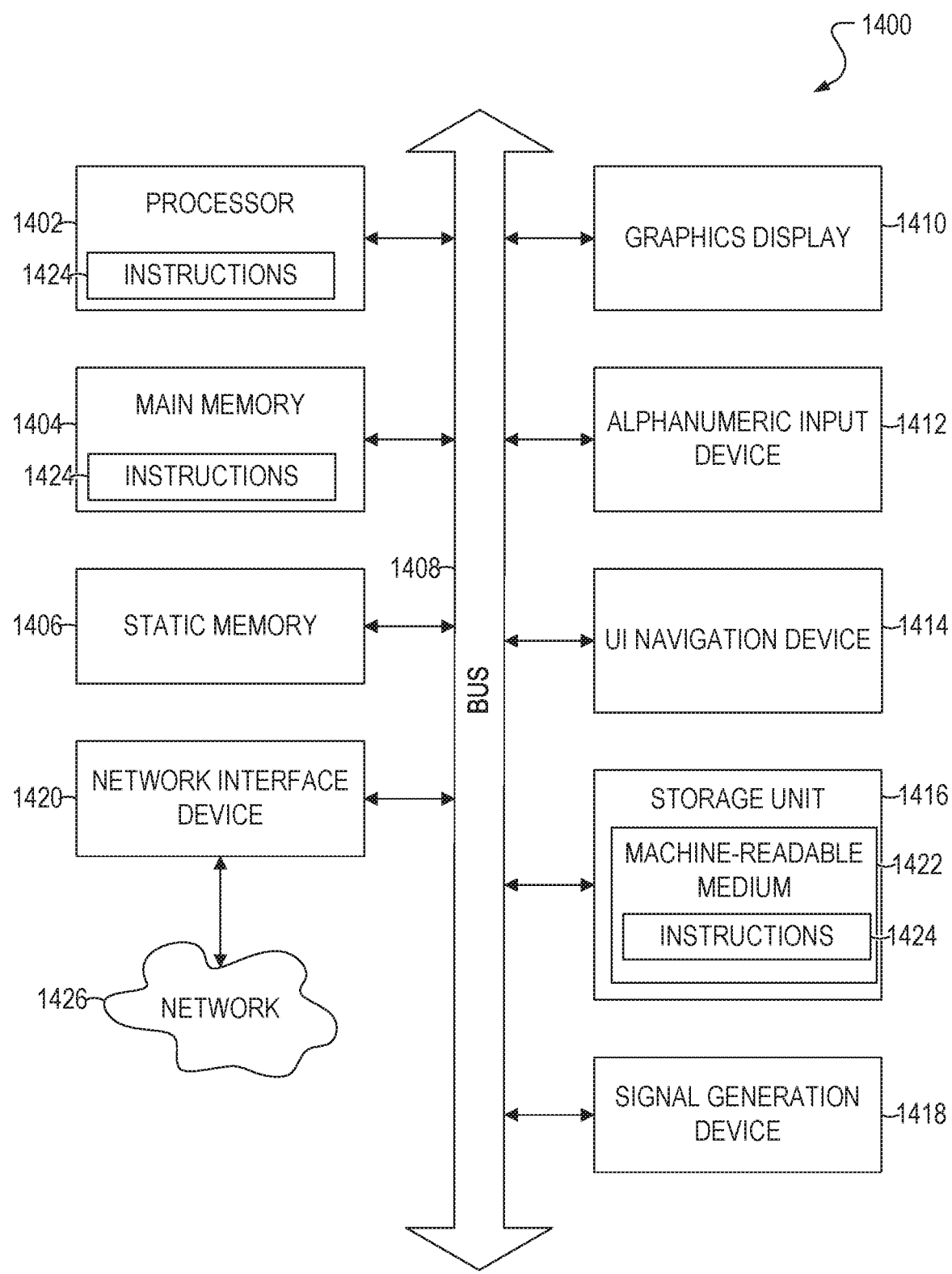
FIG. 14 is a block diagram of an example computer system on which methodologies described herein may be executed, in accordance with an example embodiment.

FIG. 14 is a block diagram of an example computer system 1400 on which methodologies described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a graphics display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation device 1414 (e.g., a mouse), a storage unit 1416, a signal generation device 1418 (e.g., a speaker) and a network interface device 1420.

The storage unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding or carrying instructions (e.g., instructions 1424) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

The following numbered examples are embodiments.
1. A computer-implemented method comprising:
   identifying, by a computer system having a memory and at least one hardware processor, a plurality of original attributes of a user of an online service stored in association with a profile of the user in a database of the online service;
   identifying, by the computer system, a plurality of online postings for which the user has performed at least one of a plurality of online actions within a particular sliding window of time defining a most recent time period;
   determining, by the computer system, a total number of online postings in the plurality of online postings;
   for each original attribute in the plurality of original attributes, determining, by the computer system, an attribute activity number representing a number of online postings in the plurality of online postings that have the original attribute;
   for each original attribute in the plurality of original attributes, determining, by the computer system, a frequency value representing how many of a total number of online postings published on the online service within the particular sliding window of time have the original attribute;
   for each original attribute in the plurality of original attributes, calculating, by the computer system, a corresponding relevance score based on the corresponding attribute activity number of the original attribute, the total number of online postings in the plurality of online postings, and an inverse of the corresponding frequency value of the original attribute; and
   causing, by the computer system, at least one recommendation associated with the user to be displayed within a user interface on a computing device based on the calculated relevance scores of the plurality of original attributes of the user.
2 The computer-implemented method of example 1, wherein the corresponding relevance score comprises a multiplication product of a ratio of the corresponding attribute activity number of the original attribute to the total number of online postings in the plurality of online postings and the inverse of the corresponding frequency value.

3. The computer-implemented method of example 1 or example wherein:
   the identifying the plurality of online postings for which the user has performed at least one of the plurality of online actions comprises identifying a corresponding type of online action for each one of the at least one of the plurality of online actions performed by the user; and the calculating the corresponding relevance score comprises weighting the corresponding attribute activity number of the original attribute and the total number of online postings in the plurality of online postings based on the identifying of the corresponding type of online action for each one of the at least one of the plurality of online actions performed by the user.

4. The computer-implemented method of any one of examples 1 to 3, wherein each one of the plurality of online actions has a corresponding weight value, the weight values of the plurality of online actions are different from one another, and the weighting the corresponding attribute activity number of the original attribute and the total number of online postings in the plurality of online postings comprises:
   for each one of the plurality of online postings for which the user has performed at least two of the plurality of online actions, selecting one of the at least two of the plurality of online actions to use in weighting the corresponding attribute activity number of the original attribute based on the corresponding weight value of the selected one being higher than the corresponding weight value of the other ones of the at least two of the plurality of online actions.

5. The computer-implemented method of any one of examples 1 to 4, wherein the plurality of online postings comprises a plurality of online job postings, and the plurality of online actions comprises viewing an online job posting, saving the online job posting, and submitting an application for the online job posting.

6. The computer-implemented method of any one of examples 1 to 5, further comprising storing, by the computer system, the calculated relevance scores in association with the corresponding original attributes of the user in the database of the online service, wherein the causing the at least one recommendation associated with the user to be displayed comprises:
   retrieving the stored calculated relevance scores from the database; and
   generating the at least one recommendation based on the retrieved relevance scores.

7. The computer-implemented method of any one of examples 1 to 6, further comprising:
   for each one of at least a portion of the plurality of original attributes, identifying, by the computer system, a corresponding plurality of related attributes based on a corresponding measure of association between each one of the plurality of related attributes and the one of the at least a portion of the plurality of original attributes; and
   for each one of the at least a portion of the plurality of original attributes, calculating, by the computer system, a corresponding relevance score for each one of the corresponding plurality of related attributes based on the corresponding relevance score of the one of the at least a portion of the plurality of original attributes, the corresponding measure of association between the related attribute and the one of the at least a portion of the plurality of original attributes, and a discounting factor configured to make the corresponding relevance score of the related attribute less than the corresponding relevance score of the one of the at least a portion of the plurality of original attributes,
   wherein the display of the at least one recommendation associated with the user is further based on the calculated relevance scores of the plurality of related attributes.

8. The computer-implemented method of any one of examples 1 to 7, wherein the identifying of the related attributes and the calculating of the relevance scores for the related attributes are performed based on a determination that a total number of the plurality of original attributes does not satisfy a threshold value.

9. The computer-implemented method of any one of examples 1 to 8, further comprising:
   determining, by the computer system, a total number of plurality of original attributes that have a corresponding relevance score that satisfies a threshold relevance score; and
   determining, by the computer system, that the total number does not satisfy a threshold value,
   wherein the identifying of the related attributes and the calculating of the relevance scores for the related attributes are performed based on the determination that the total number does not satisfy the threshold value.

10. The computer-implemented method of any one of examples 1 to 9, wherein the at least one recommendation comprises at least one job recommendation of an online job posting published on the online service, and the at least one job recommendation is caused to be displayed to the user on the computing device.

11. The computer-implemented method of any one of examples 1 to 10, wherein the at least one recommendation comprises at least one candidate recommendation for an online job posting published on the online service, and the at least one candidate recommendation is caused to be displayed to a recruiter for the other online job posting on the computing device.

12. The computer-implemented method of any one of examples 1 to 11, wherein the at least one recommendation comprises at least one course recommendation of an online course published on the online service, and the at least one course recommendation is caused to be displayed to the user on the computing device.

13. A system comprising:
    at least one processor; and
    a non-transitory computer-readable medium storing executable instructions that, when executed, cause the at least one processor to perform the method of any one of examples 1 to 12.

14. A non-transitory machine-readable storage medium, tangibly embodying a set of instructions that, when executed by at least one processor, causes the at least one processor to perform the method of any one of examples 1 to 12.

15. A machine-readable medium carrying a set of instructions that, when executed by at least one processor, causes the at least one processor to carry out the method of any one of examples 1 to 12.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    identifying, by a computer system having a memory and at least one hardware processor, a plurality of original attributes of a user of an online service stored in association with a profile of the user in a database of the online service;
    identifying, by the computer system, a plurality of online postings for which the user has performed at least one of a plurality of online actions by selecting one or more user interface elements within a particular sliding window of time defining a most recent time period;
    determining, by the computer system, a total number of online postings in the plurality of online postings;
    for each original attribute in the plurality of original attributes, determining, by the computer system, an attribute activity number representing a number of online postings in the plurality of online postings that have the original attribute;
    for each original attribute in the plurality of original attributes, determining, by the computer system, a frequency value representing how many of a total number of online postings published on the online service within the particular sliding window of time have the original attribute;
    for each original attribute in the plurality of original attributes, calculating, by the computer system, a corresponding relevance score based on the corresponding attribute activity number of the original attribute, the total number of online postings in the plurality of online postings, and an inverse of the corresponding frequency value of the original attribute; and
    causing, by the computer system, at least one recommendation associated with the user to be displayed within a user interface on a computing device based on the calculated relevance scores of the plurality of original attributes of the user.

2. The computer-implemented method of claim 1, wherein the corresponding relevance score comprises a multiplication product of a ratio of the corresponding attribute activity number of the original attribute to the total number of online postings in the plurality of online postings and the inverse of the corresponding frequency value.

3. The computer-implemented method of claim 1, wherein:
    the identifying the plurality of online postings for which the user has performed at least one of the plurality of online actions comprises identifying a corresponding type of online action for each one of the at least one of the plurality of online actions performed by the user; and
    the calculating the corresponding relevance score comprises weighting the corresponding attribute activity number of the original attribute and the total number of online postings in the plurality of online postings based on the identifying of the corresponding type of online action for each one of the at least one of the plurality of online actions performed by the user.

4. The computer-implemented method of claim 3, wherein each one of the plurality of online actions has a corresponding weight value, the weight values of the plurality of online actions are different from one another, and the weighting the corresponding attribute activity number of the original attribute and the total number of online postings in the plurality of online postings comprises:
    for each one of the plurality of online postings for which the user has performed at least two of the plurality of online actions, selecting one of the at least two of the plurality of online actions to use in weighting the corresponding attribute activity number of the original attribute based on the corresponding weight value of the selected one being higher than the corresponding weight value of the other ones of the at least two of the plurality of online actions.

5. The computer-implemented method of claim 1, wherein the plurality of online postings comprises a plurality of online job postings, and the plurality of online actions comprises viewing an online job posting, saving the online job posting, and submitting an application for the online job posting.

6. The computer-implemented method of claim 1, further comprising storing, by the computer system, the calculated relevance scores in association with the corresponding original attributes of the user in the database of the online service, wherein the causing the at least one recommendation associated with the user to be displayed comprises:
    retrieving the stored calculated relevance scores from the database; and
    generating the at least one recommendation based on the retrieved relevance scores.

7. The computer-implemented method of claim 1, further comprising:
    for each one of at least a portion of the plurality of original attributes, identifying, by the computer system, a corresponding plurality of related attributes based on a corresponding measure of association between each one of the plurality of related attributes and the one of the at least a portion of the plurality of original attributes; and
    for each one of the at least a portion of the plurality of original attributes, calculating, by the computer system, a corresponding relevance score for each one of the corresponding plurality of related attributes based on the corresponding relevance score of the one of the at least a portion of the plurality of original attributes, the corresponding measure of association between the related attribute and the one of the at least a portion of the plurality of original attributes, and a discounting factor configured to make the corresponding relevance score of the related attribute less than the corresponding relevance score of the one of the at least a portion of the plurality of original attributes, wherein the display of the at least one recommendation associated with the user is further based on the calculated relevance scores of the plurality of related attributes.

8. The computer-implemented method of claim 7, wherein the identifying of the related attributes and the calculating of the relevance scores for the related attributes are performed in response to a determination that a total number of the plurality of original attributes does not satisfy a threshold value.

9. The computer-implemented method of claim 7, further comprising:

determining, by the computer system, a total number of plurality of original attributes that have a corresponding relevance score that satisfies a threshold relevance score; and determining, by the computer system, that the total number does not satisfy a threshold value, wherein the identifying of the related attributes and the calculating of the relevance scores for the related attributes are performed based on the determination that the total number does not satisfy the threshold value.

10. The computer-implemented method of claim 1, wherein the at least one recommendation comprises at least one job recommendation of an online job posting published on the online service, and the at least one job recommendation is caused to be displayed to the user on the computing device.

11. The computer-implemented method of claim 1, wherein the at least one recommendation comprises at least one candidate recommendation for an online job posting published on the online service, and the at least one candidate recommendation is caused to be displayed to a recruiter for the other online job posting on the computing device.

12. The computer-implemented method of claim 1, wherein the at least one recommendation comprises at least one course recommendation of an online course published on the online service, and the at least one course recommendation is caused to be displayed to the user on the computing device.

13. A system comprising:
at least one hardware processor; and
a non-transitory machine-readable medium embodying a set of instructions that, when executed by the at least one hardware processor, cause the at least one processor to perform operations, the operations comprising:
identifying a plurality of original attributes of a user of an online service stored in association with a profile of the user in a database of the online service;
identifying a plurality of online postings for which the user has performed at least one of a plurality of online actions by selecting one or more user interface elements within a particular sliding window of time defining a most recent time period;
determining a total number of online postings in the plurality of online postings;
for each original attribute in the plurality of original attributes, determining an attribute activity number representing a number of online postings in the plurality of online postings that have the original attribute;
for each original attribute in the plurality of original attributes, determining a frequency value representing how many of a total number of online postings published on the online service within the particular sliding window of time have the original attribute;
for each original attribute in the plurality of original attributes, calculating a corresponding relevance score based on the corresponding attribute activity number of the original attribute, the total number of online postings in the plurality of online postings, and an inverse of the corresponding frequency value of the original attribute; and
causing at least one recommendation associated with the user to be displayed within a user interface on a computing device based on the calculated relevance scores of the plurality of original attributes of the user.

14. The system of claim 13, wherein the corresponding relevance score comprises a multiplication product of a ratio of the corresponding attribute activity number of the original attribute to the total number of online postings in the plurality of online postings and the inverse of the corresponding frequency value.

15. The system of claim 13, wherein:
the identifying the plurality of online postings for which the user has performed at least one of the plurality of online actions comprises identifying a corresponding type of online action for each one of the at least one of the plurality of online actions performed by the user; and
the calculating the corresponding relevance score comprises weighting the corresponding attribute activity number of the original attribute and the total number of online postings in the plurality of online postings based on the identifying of the corresponding type of online action for each one of the at least one of the plurality of online actions performed by the user.

16. The system of claim 15, wherein each one of the plurality of online actions has a corresponding weight value, the weight values of the plurality of online actions are different from one another, and the weighting the corresponding attribute activity number of the original attribute and the total number of online postings in the plurality of online postings comprises:
for each one of the plurality of online postings for which the user has performed at least two of the plurality of online actions, selecting one of the at least two of the plurality of online actions to use in weighting the corresponding attribute activity number of the original attribute based on the corresponding weight value of the selected one being higher than the corresponding weight value of the other ones of the at least two of the plurality of online actions.

17. The system of claim 13, wherein the plurality of online postings comprises a plurality of online job postings, and the plurality of online actions comprises viewing an online job posting, saving the online job posting, and submitting an application for the online job posting.

18. The system of claim 13, wherein the at least one recommendation comprises at least one job recommendation of an online job posting published on the online service, and the at least one job recommendation is caused to be displayed to the user on the computing device.

19. The system of claim 13, wherein the at least one recommendation comprises at least one candidate recommendation for an online job posting published on the online service, and the at least one candidate recommendation is caused to be displayed to a recruiter for the other online job posting on the computing device.

20. A non-transitory machine-readable medium embodying a set of instructions that, when executed by at least one hardware processor, cause the processor to perform operations, the operations comprising:

identifying a plurality of original attributes of a user of an online service stored in association with a profile of the user in a database of the online service;

identifying a plurality of online postings for which the user has performed at least one of a plurality of online actions by selecting one or more user interface elements within a particular sliding window of time defining a most recent time period;

determining a total number of online postings in the plurality of online postings;

for each original attribute in the plurality of original attributes, determining an attribute activity number representing a number of online postings in the plurality of online postings that have the original attribute;

for each original attribute in the plurality of original attributes, determining a frequency value representing how many of a total number of online postings published on the online service within the particular sliding window of time have the original attribute;

for each original attribute in the plurality of original attributes, calculating a corresponding relevance score based on the corresponding attribute activity number of the original attribute, the total number of online postings in the plurality of online postings, and an inverse of the corresponding frequency value of the original attribute; and causing at least one recommendation associated with the user to be displayed within a user interface on a computing device based on the calculated relevance scores of the plurality of original attributes of the user.

* * * * *